(12) United States Patent
Panda et al.

(10) Patent No.: US 12,249,147 B2
(45) Date of Patent: Mar. 11, 2025

(54) ADAPTIVE SELECTION OF DATA MODALITIES FOR EFFICIENT VIDEO RECOGNITION

(71) Applicant: International Business Machines Corporation, Armonk, NY (US)

(72) Inventors: Rameswar Panda, Medford, MA (US); Richard Chen, Baldwin Place, NY (US); Quanfu Fan, Lexington, MA (US); Rogerio Schmidt Feris, West Hartford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 515 days.

(21) Appl. No.: 17/199,307

(22) Filed: Mar. 11, 2021

(65) Prior Publication Data

US 2022/0292285 A1     Sep. 15, 2022

(51) Int. Cl.
*G06V 20/40*     (2022.01)
*G06F 18/214*    (2023.01)
(Continued)

(52) U.S. Cl.
CPC ............ *G06V 20/46* (2022.01); *G06F 18/214* (2023.01); *G06F 18/256* (2023.01); *G06N 20/00* (2019.01); *G06V 20/49* (2022.01)

(58) Field of Classification Search
CPC ........ G06V 20/46; G06V 20/49; G06V 10/88; G06V 10/82; G06F 18/214; G06F 18/256; G06N 20/00; G06N 3/045
See application file for complete search history.

(56) References Cited

U.S. PATENT DOCUMENTS

| 7,742,641 | B2 | 6/2010 | Ivanov | |
|---|---|---|---|---|
| 8,135,221 | B2 * | 3/2012 | Jiang | ............ G10L 25/00 382/305 |

(Continued)

FOREIGN PATENT DOCUMENTS

| CN | 105022835 A | 11/2015 |
|---|---|---|
| CN | 109508375 A | 3/2019 |
| CN | 111507311 A | 8/2020 |

OTHER PUBLICATIONS

International Search Report & Written Opinion dated May 26, 2022 for International Application PCT/CN2022/080147 from National Intellectual Property Administration, pp. 1-9, Beijing China.

(Continued)

*Primary Examiner* — Solomon G Bezuayehu
(74) *Attorney, Agent, or Firm* — Rakesh Roy

(57) ABSTRACT

One embodiment of the invention provides a method for video recognition. The method comprises receiving an input video comprising a sequence of video segments over a plurality of data modalities. The method further comprises, for a video segment of the sequence, selecting one or more data modalities based on data representing the video segment. Each data modality selected is optimal for video recognition of the video segment. The method further comprises, for each data modality selected, providing at least one data input representing the video segment over the data modality selected to a machine learning model corresponding to the data modality selected, and generating a first type of prediction representative of the video segment via the machine learning model. The method further comprises determining a second type of prediction representative of the entire input video by aggregating all first type of predictions generated.

15 Claims, 14 Drawing Sheets

(51) Int. Cl.
*G06F 18/25* (2023.01)
*G06N 20/00* (2019.01)

(56) References Cited

U.S. PATENT DOCUMENTS

| | | | | |
|---|---|---|---|---|
| 8,700,557 | B2* | 4/2014 | Gupta | G06N 20/00 |
| | | | | 706/52 |
| 9,031,843 | B2* | 5/2015 | Ma | G10L 15/06 |
| | | | | 704/254 |
| 9,836,853 | B1* | 12/2017 | Médioni | G06V 20/40 |
| 10,248,866 | B1* | 4/2019 | Cotoros | G06V 40/19 |
| 11,574,477 | B2* | 2/2023 | Wu | G06V 20/47 |
| 2002/0178344 | A1* | 11/2002 | Bourguet | G06F 9/542 |
| | | | | 712/1 |
| 2003/0033347 | A1* | 2/2003 | Bolle | G06F 16/786 |
| | | | | 707/E17.022 |
| 2004/0085339 | A1* | 5/2004 | Divakaran | G06V 20/40 |
| | | | | 715/721 |
| 2006/0218481 | A1* | 9/2006 | Adams Jr. | G06F 40/169 |
| | | | | 715/233 |
| 2006/0251385 | A1* | 11/2006 | Hwang | G06F 16/785 |
| | | | | 386/214 |
| 2011/0081082 | A1* | 4/2011 | Jiang | G10L 25/00 |
| | | | | 382/224 |
| 2011/0305141 | A1* | 12/2011 | Horovitz | H04L 43/08 |
| | | | | 370/241 |
| 2011/0310964 | A1* | 12/2011 | Beymer | G06T 7/0012 |
| | | | | 375/E7.026 |
| 2012/0206438 | A1* | 8/2012 | Porikli | G06V 20/653 |
| | | | | 345/419 |
| 2014/0092990 | A1* | 4/2014 | Vuskovic | H04N 21/85403 |
| | | | | 375/240.26 |
| 2014/0337733 | A1* | 11/2014 | Rodriguez | H04M 1/72469 |
| | | | | 715/718 |
| 2015/0029222 | A1* | 1/2015 | Hofmann | G06T 7/74 |
| | | | | 382/103 |
| 2016/0227282 | A1* | 8/2016 | Chang | H04N 21/4334 |
| 2016/0283858 | A1* | 9/2016 | Lin | G06N 20/00 |
| 2017/0065889 | A1* | 3/2017 | Cheng | A63F 13/497 |
| 2017/0289624 | A1* | 10/2017 | Avila | G06V 20/49 |
| 2019/0050996 | A1* | 2/2019 | Abdelhak | G06N 3/045 |
| 2019/0303797 | A1* | 10/2019 | Javali | G10L 15/22 |
| 2019/0354797 | A1 | 11/2019 | Nesta et al. | |
| 2020/0021873 | A1* | 1/2020 | Swaminathan | H04N 21/466 |
| 2020/0143169 | A1* | 5/2020 | Vaezi Joze | G06N 3/088 |
| 2020/0167554 | A1* | 5/2020 | Wang | G06V 40/20 |
| 2020/0195983 | A1* | 6/2020 | Chao | G06F 16/7328 |
| 2020/0268471 | A1* | 8/2020 | Kajita | H04N 7/18 |
| 2020/0272823 | A1* | 8/2020 | Liu | G06F 18/24317 |
| 2021/0044864 | A1* | 2/2021 | Begun | G06V 40/172 |
| 2021/0117685 | A1* | 4/2021 | Sureshkumar | H04N 21/44016 |
| 2021/0125100 | A1* | 4/2021 | Santos | G06F 16/7867 |
| 2022/0157045 | A1* | 5/2022 | Ehteshami Bejnordi | G06V 10/82 |
| 2022/0198814 | A1* | 6/2022 | Tandel | G06V 30/1478 |
| 2022/0245424 | A1* | 8/2022 | Goyal | G06V 10/82 |
| 2023/0053838 | A1* | 2/2023 | Namiki | G06T 7/0004 |
| 2023/0130410 | A1* | 4/2023 | Luo | H04N 19/147 |
| | | | | 382/232 |
| 2023/0140369 | A1* | 5/2023 | Aminian | G06F 16/739 |
| | | | | 382/103 |

OTHER PUBLICATIONS

Harb, J. et al., "Policy Evaluation Networks", arXiv:2002.11833v1, published electronically Feb. 26, 2020, retrieved Jan. 5, 2021, 12 pages, United States.

Liu et al. "Multi-Modal Local Receptive Field Extreme Learning Machine for Object Recognition", Neurocomputing. Feb. 14, 2018, pp. 4-11, DOI: http://dx.doi.org/10.1016/j.neucom.2017.04.077, retrieved Jan. 5, 2021, vol. 277, Elvesier B.V., Netherlands {Abstract Only}.

Liu, H. et al., "Weakly Paired Multimodal Fusion for Object Recognition", IEEE Transactions on Automation Science and Engineering, Apr. 5, 2018, pp. 784-795, downloaded: http://dx.doi.org/10.11109/TASE.2017.269271., retrieved Jan. 21, 2021, vol. 15, No. 2, IEEE, United States.

Mell et al., "The NIST Definition of Cloud Computing," National Institute of Standards and Technology Special Publication 800-145, Sep. 2011, 7 pages, United States.

* cited by examiner

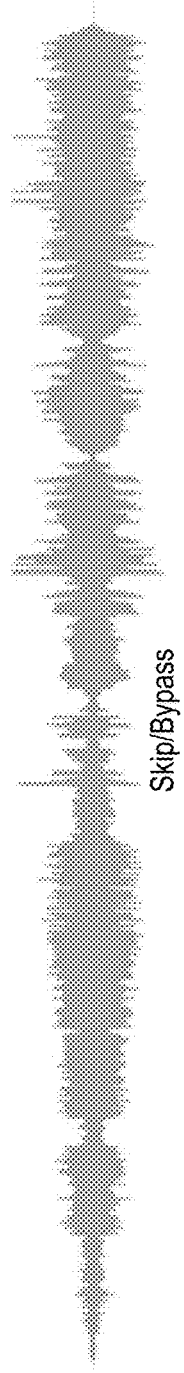
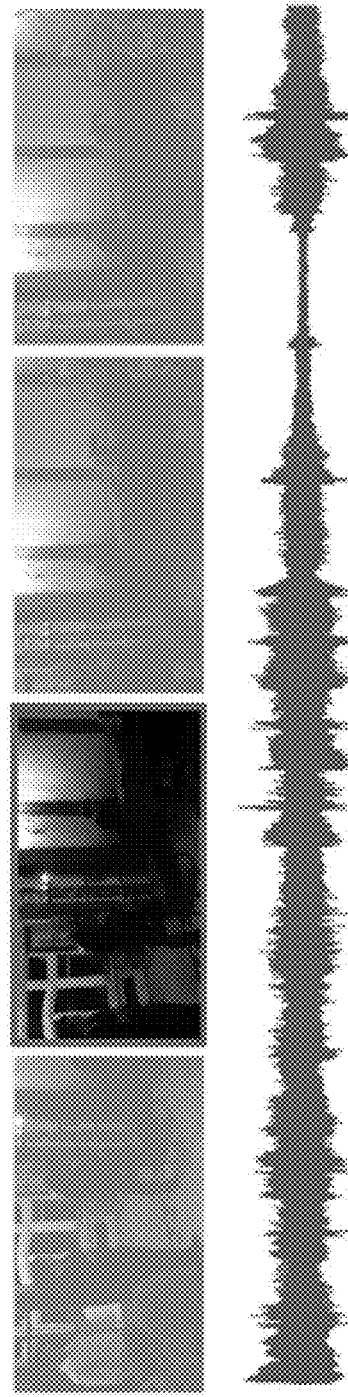
FIG. 5A
FIG. 5B

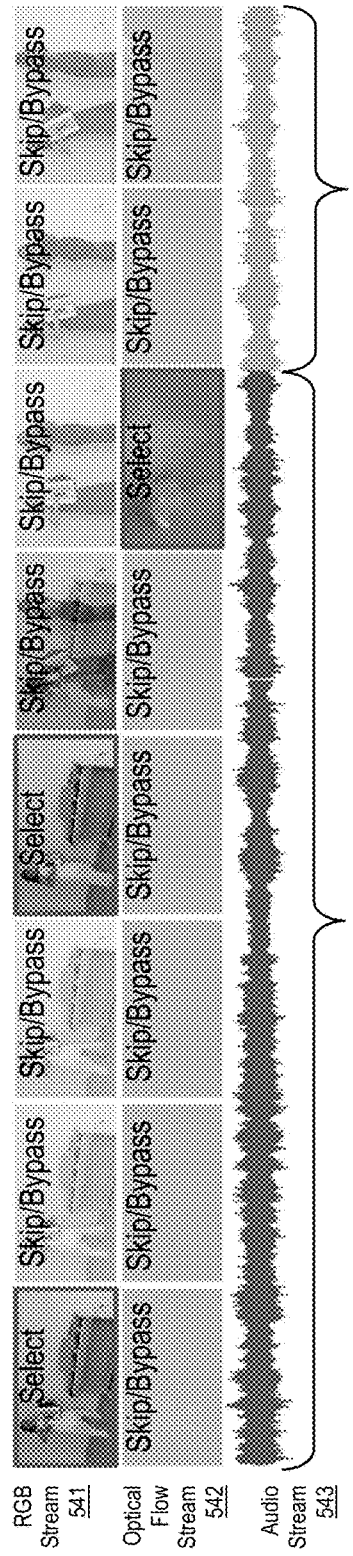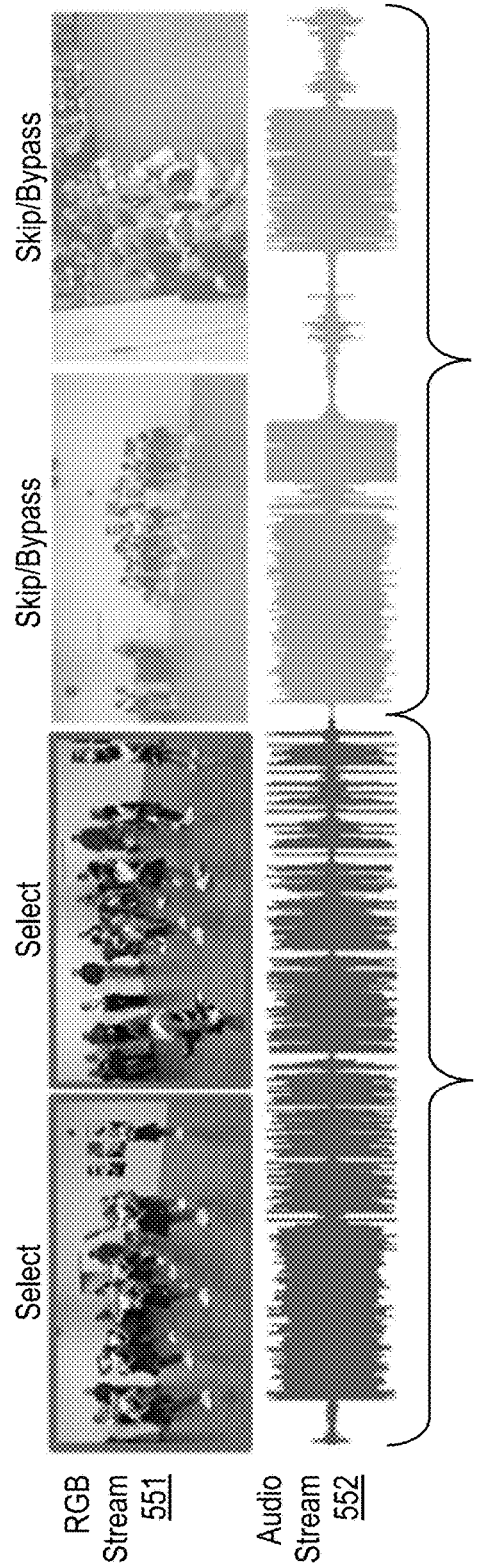

ADAPTIVE SELECTION OF DATA MODALITIES FOR EFFICIENT VIDEO RECOGNITION

BACKGROUND

The field of embodiments of the invention generally relate to video recognition.

Video recognition is a machine learning (ML) based computer vision task that involves acquiring, processing, and analyzing data coming from visual sources such as videos. Multimodal learning is widely used in video recognition. Multimodal learning utilizes various data modalities to improve performance of a model. A model trained via multimodal learning represents the joint representations of different data modalities. Most conventional deep multimodal models focus on how to fuse information from multiple data modalities. Conventional video recognition solutions that utilize multimodal learning, however, are computationally expensive as these solutions usually process all data coming from visual sources, including redundant/irrelevant portions of the data. For example, a conventional solution may analyze the entirety of multiple data streams representing the video over different data modalities, such as a RGB stream and an audio stream, to recognize an activity (i.e., action) performed in the video. It may not be necessary, however, to analyze the multiple data streams for all video segments of the video to recognize the activity performed in the video. There is a need to provide an adaptive multimodal learning framework that increases efficiency in video recognition (i.e., increases computational efficiency), yields significant savings in computation (i.e., reduces computational costs), and improves accuracy of video recognition (i.e., increases accuracy/quality of predictions/classifications) by selecting on-the-fly data modalities optimal for video recognition of each video segment of a video based on inputs (i.e., data-dependent selection of different data modalities for each video segment).

SUMMARY

Embodiments of the invention generally relate to video recognition, and more specifically, to a method and system for adaptive selection of data modalities for efficient video recognition.

One embodiment of the invention provides a method for video recognition. The method comprises receiving an input video comprising a sequence of video segments over a plurality of data modalities. The method further comprises, for a video segment of the sequence, selecting one or more data modalities from the plurality of data modalities based on data representing the video segment. Each data modality selected is optimal for video recognition of the video segment. The method further comprises, for each data modality selected, providing at least one data input representing the video segment over the data modality selected to a machine learning model corresponding to the data modality selected, and generating a first type of prediction representative of the video segment via the machine learning model. The method further comprises determining a second type of prediction representative of the entire input video by aggregating all first type of predictions generated. The second type of prediction is indicative of an object or an activity captured in the input video. Other embodiments include a system for video recognition, and a computer program product for video recognition. These features contribute to the advantage of providing an optimal trade-off between video recognition accuracy and computational efficiency.

One or more of the following features may be included. In some embodiments, each data modality of the plurality of data modalities has a corresponding machine learning model that is jointly trained with one or more other machine learning models corresponding to one or more other data modalities of the plurality of data modalities. In some embodiments, each machine learning model corresponding to each data modality of the plurality of data modalities comprises a sub-network. These optional features contribute to the advantage of learning a decision policy that favors selection of data modalities that are computationally more efficient in recognizing videos.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

FIG. 5A illustrates a first sequence of video segments over different modalities, in accordance with an embodiment of the invention;

FIG. 5B illustrates a second sequence of video segments over different modalities, in accordance with an embodiment of the invention;

FIG. 5E illustrates a fifth sequence of video segments over different modalities, in accordance with an embodiment of the invention;

FIG. 5F illustrates a sixth sequence of video segments over different modalities, in accordance with an embodiment of the invention;

Figure 1:
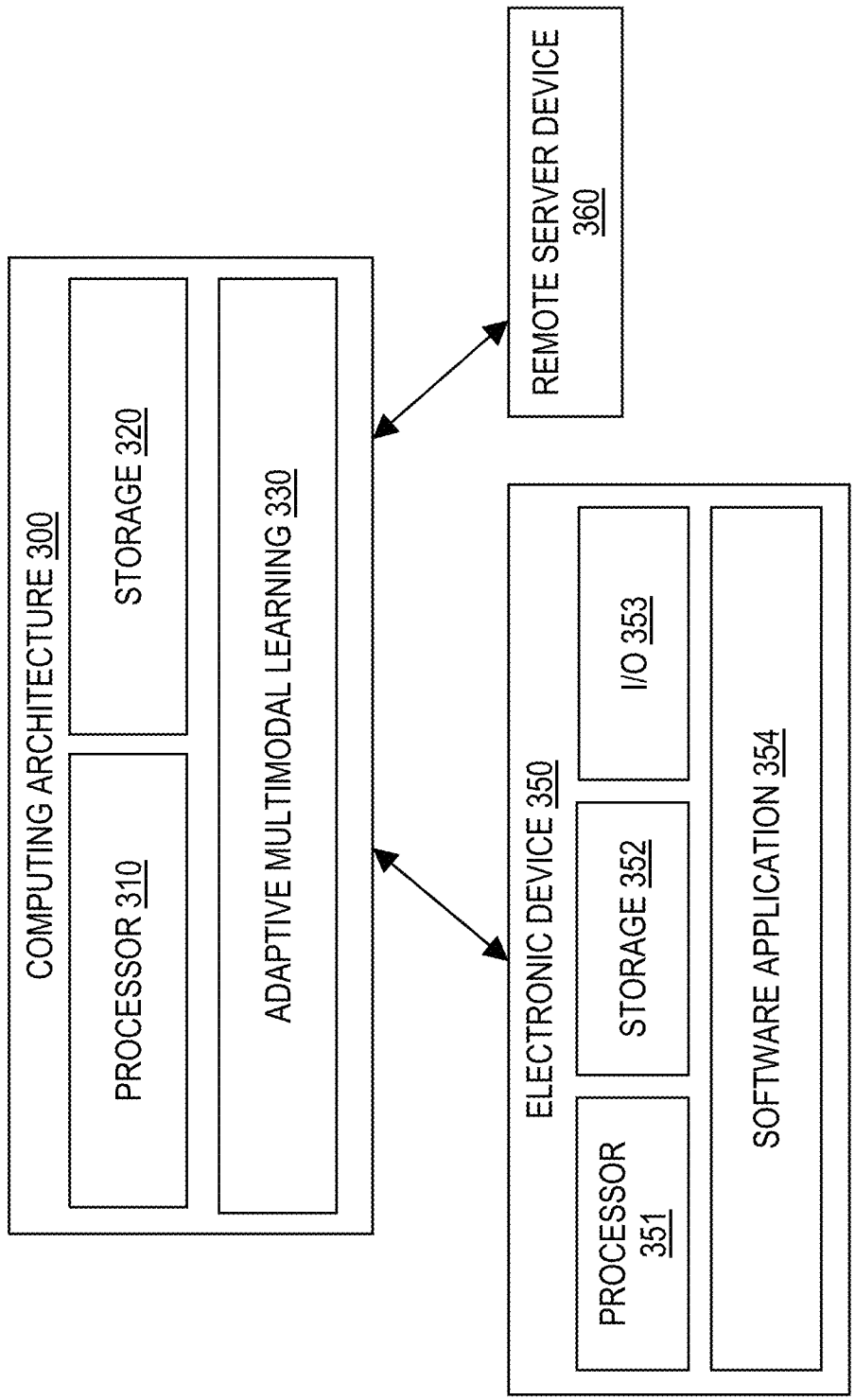
FIG. 1 illustrates an example computing architecture for implementing adaptive selection of data modalities for efficient video recognition, in accordance with an embodiment of the invention.

The detailed description explains the preferred embodiments of the invention, together with advantages and features, by way of example with reference to the drawings.

DETAILED DESCRIPTION

Embodiments of the invention generally relate to video recognition, and more specifically, to a method and system for adaptive selection of data modalities for efficient video recognition. One embodiment of the invention provides a method for video recognition. The method comprises receiving an input video comprising a sequence of video segments over a plurality of data modalities. The method further comprises, for a video segment of the sequence, selecting one or more data modalities from the plurality of data modalities based on data representing the video segment. Each data modality selected is optimal for video recognition of the video segment. The method further comprises, for each data modality selected, providing at least one data input representing the video segment over the data modality selected to a machine learning model corresponding to the data modality selected, and generating a first type of prediction representative of the video segment via the machine learning model. The method further comprises determining a second type of prediction representative of the entire input video by aggregating all first type of predictions generated. The second type of prediction is indicative of an object or an activity captured in the input video.

Another embodiment of the invention provides a system for video recognition. The system comprises at least one processor, and a non-transitory processor-readable memory device storing instructions that when executed by the at least one processor causes the at least one processor to perform operations. The operations include receiving an input video comprising a sequence of video segments over a plurality of data modalities. The operations further include, for a video segment of the sequence, selecting one or more data modalities from the plurality of data modalities based on data representing the video segment. Each data modality selected is optimal for video recognition of the video segment. The instructions further include, for each data modality selected, providing at least one data input representing the video segment over the data modality selected to a machine learning model corresponding to the data modality selected, and generating a first type of prediction representative of the video segment via the machine learning model. The instructions further include determining a second type of prediction representative of the entire input video by aggregating all first type of predictions generated. The second type of prediction is indicative of an object or an activity captured in the input video.

One embodiment of the invention provides a computer program product for video recognition. The computer program product comprises a computer readable storage medium having program instructions embodied therewith. The program instructions are executable by a processor to cause the processor to receive an input video comprising a sequence of video segments over a plurality of data modalities. The program instructions are executable by the processor to further cause the processor to, for a video segment of the sequence, select one or more data modalities from the plurality of data modalities based on data representing the video segment. Each data modality selected is optimal for video recognition of the video segment. The program instructions are executable by the processor to further cause the processor to, for each data modality selected, provide at least one data input representing the video segment over the data modality selected to a machine learning model corresponding to the data modality selected, and generate a first type of prediction representative of the video segment via the machine learning model. The program instructions are executable by the processor to further cause the processor to determine a second type of prediction representative of the entire input video by aggregating all first type of predictions generated. The second type of prediction is indicative of an object or an activity captured in the input video.

FIG. 1 illustrates an example computing architecture 300 for implementing adaptive selection of data modalities for efficient video recognition, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, an adaptive multimodal learning system 330. As described in detail later herein, the system 330 is configured for data-dependent selection of different modalities for efficient video recognition.

In one embodiment, the system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters, provide input, etc.

In one embodiment, an electronic device 350 and/or a remote server device 360 may be a source of at least one of the following: input video, training video.

In one embodiment, the system 330 may be accessed or utilized by one or more online services (e.g., AI services) hosted on a remote server device 360 and/or one or more software applications 354 (e.g., AI applications) operating on an electronic device 350. For example, in one embodiment, a virtual assistant, a search engine, or another type of software application 354 operating on an electronic device 350 can invoke the system 330 to perform an AI task.

Figure 2:
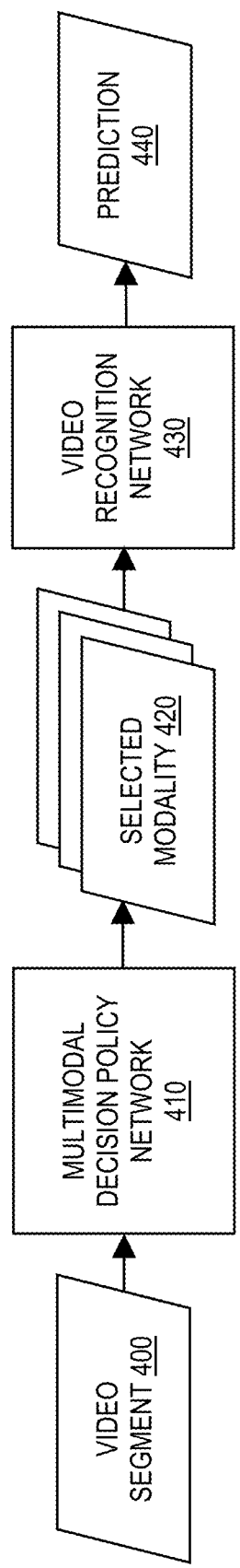
FIG. 2 illustrates an example adaptive multimodal learning system, in accordance with an embodiment of the invention.

FIG. 2 illustrates an example adaptive multimodal learning system 330, in accordance with an embodiment of the invention. An input video comprises a sequence of video segments 400 over one or more data modalities. Examples of data modalities include, but are not limited to, a RGB modality, an audio modality, an optical flow modality, etc.

The sequence of video segments 400 is represented as one or more data streams. Each data stream comprises a sequence of data inputs representing the sequence of video segments 400 over a particular data modality. Examples of data streams include, but are not limited to, a RGB stream comprising a sequence of RGB inputs (i.e., RGB frames of video segments 400), an audio stream comprising a sequence of audio inputs (i.e., audio frames of video segments 400), an optical flow stream comprising a sequence of optical flow inputs (i.e., optical flow frames of video segments 400), and/or a RGB difference stream comprising a sequence of RGB difference inputs (i.e., RGB difference frames of video segments 400).

Figure 3:
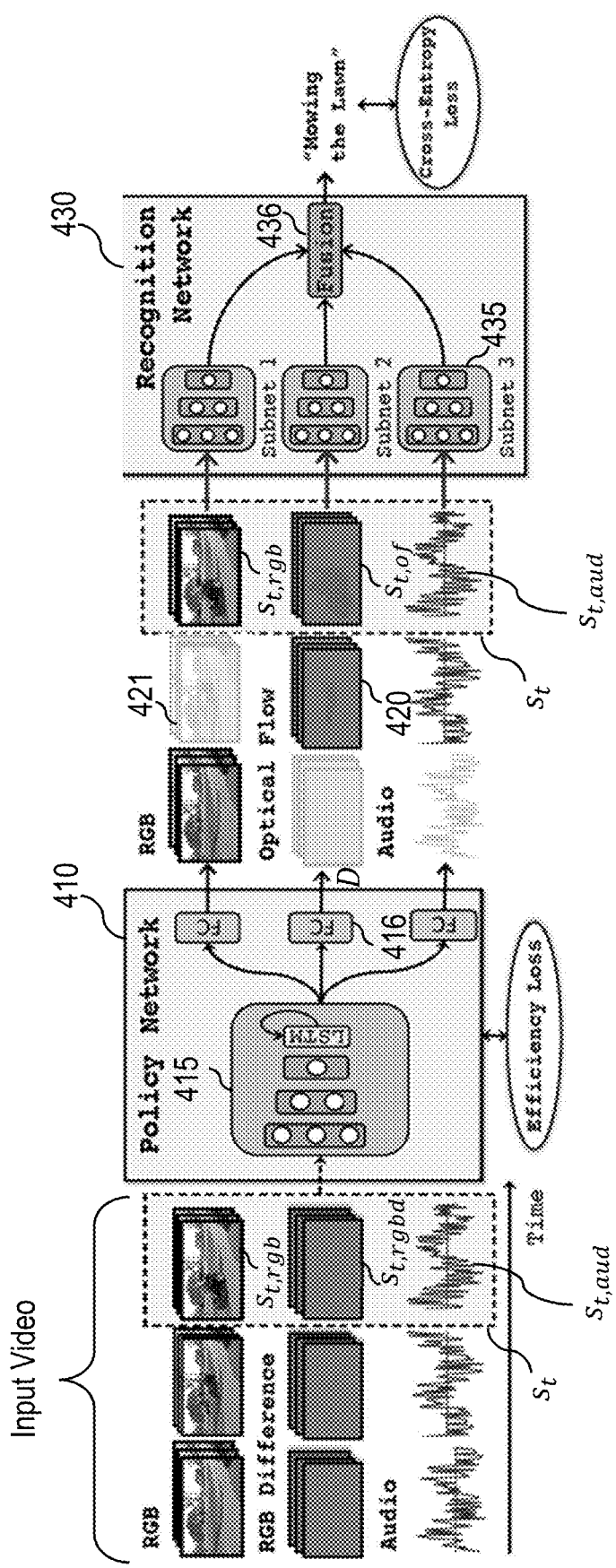
FIG. 3 illustrates example components of a decision policy network and a video recognition network included in the system, in accordance with an embodiment of the invention.

In one embodiment, the system 330 comprises a multimodal decision policy network 410 and a video recognition network 430. The video recognition network 430 comprises a plurality of machine learning models trained for video recognition of different video segments 400 over a plurality of data modalities. In one embodiment, the plurality of machine learning models including different sub-networks 435 (FIG. 3). Each sub-network 435 of the different sub-networks 435 corresponds to a particular data modality than is different from another data modality that another sub-network 435 of the different sub-networks 435 corresponds to. Each sub-network 435 is configured to receive and process data inputs representing video segments 400 over a corresponding data modality.

In one embodiment, the multimodal decision policy network 410 is configured to receive: (1) receive an input video comprising a sequence of video segments 400, and (2) for each video segment 400 of the input video, adaptively select, from the plurality of data modalities, one or more data modalities 420 that are optimal for video recognition of the video segment 400 based on data inputs representing the video segment 400 over the plurality of data modalities. For each video segment 400 of the input video, the multimodal decision policy network 410 selects on-the-fly one or more data modalities 420 that are optimal for video recognition of the video segment conditioned on data inputs representing the video segment 400 over the plurality of data modalities. For each video segment 400 of the input video, the multimodal decision policy network 410 implements an adaptive selection of data modalities 420 suitable for video recognition of the video segment 400, and the selection is data-dependent. During video recognition, each selected data modality 420 helps focus where to look in a data stream (if the data stream is a RGB stream or an optical flow stream) or where to listen in the data stream (if the data stream is an audio stream).

In one embodiment, for each video segment 400 of an input video, the video recognition network 430 is configured to: (1) receive one or more selected data modalities 420 that are optimal for video recognition of the video segment 400 (e.g., from the decision policy network 410), (2) forward one or more data inputs representing the video segment 400 over the one or more selected data modalities 420 to one or more sub-networks 435 corresponding to the one or more selected data modalities 420, and (3) generate one or more first type of predictions (i.e., classifications) representative of the video segment 400 by processing the one or more data inputs via the one or more sub-networks 435. Specifically, for each selected data modality 420, at least one data input representing the video segment 400 over the selected data modality 420 is routed to a sub-network 435 that corresponds to the selected data modality 420. During the video recognition of the video segment 400, only data inputs representing the video segment 400 over the one or more selected data modalities 420 are processed via the one or more sub-networks 435; any data input representing the video segment 400 over an unselected data modality 421 (FIG. 3) is skipped/bypassed (i.e., not processed). Each selected data modality 420 is relevant to the video recognition of the video segment 400, whereas each unselected data modality 421 is redundant/irrelevant to the video recognition. Skipping/bypassing unselected data modalities 421 removes the need to process the entirety of multiple data streams representing the input video over different data modalities, thereby increasing computational efficiency, reducing computational costs, and improving accuracy of video recognition.

In one embodiment, a first type of prediction representative of a video segment 400 is a segment-level prediction indicative of an object or activity captured in the video segment 400 that the different sub-networks 435 are trained to recognize.

In one embodiment, the video recognition network 430 comprises a fusion unit 436 (FIG. 3). The fusion unit 436 is configured to: (1) for each video segment 400 of an input video, receive one or more first type of predictions (i.e., segment-level predictions) representative of the video segment 400 (e.g., from one or more of the different sub-networks 435), and (2) determine a second type of prediction 440 representative of the entire input video by averaging (i.e., aggregating) all first type of predictions received for all video segments 400 of the input video.

In one embodiment, a second type of prediction 440 representative of an entire input video is a video-level prediction indicative of an object or activity captured in the input video that the different sub-networks 435 are trained to recognize.

In one embodiment, the different sub-networks 435 are jointly trained (e.g., via late fusion with learnable weights).

FIG. 3 illustrates example components of the decision policy network 410 and the video recognition network 430, in accordance with an embodiment of the invention. Let V generally denote an input video comprising a sequence of video segments $\{s_1, s_2, \ldots, s_T\}$ over K data modalities $\{M_1, M_2, \ldots, M_K\}$. For each video segment of the input video V, the decision policy network 410 is configured to determine which of the K data modalities to utilize for video recognition of the video segment in order to improve accuracy of video recognition (i.e., accuracy/quality of predictions/classifications) while factoring into account computational efficiency.

In one embodiment, the decision policy network 410 comprises a unit 415 configured to model causality across different time steps in an input video V. In one embodiment, the unit 415 comprises: (a) a joint feature extractor with a corresponding trainable parameter $\theta_\phi$, and (2) a long short-term memory (LSTM) with a corresponding trainable parameter $\theta_{LSTM}$. At each time step t, the joint feature extractor is configured to: (1) receive data inputs (e.g., RGB inputs, RGB difference inputs, and/or audio inputs) representing a current video segment $s_t$ over the K data modalities, and (2) extract, from the data inputs, a joint feature $f_t$ corresponding to the current video segment $s_t$.

At each time step t, the LSTM is configured to: (1) receive a joint feature f, corresponding to a current video segment $s_t$ (e.g., from the joint feature extractor), previous hidden states $h_{t-1}$, and cell outputs $o_{t-1}$, and (2) compute current hidden states $h_t$ and cell outputs $o_t$ in accordance with equation (1) provided below:

$$h_t, o_t = \text{LSTM}(f_t; h_{t-1}; o_{t-1}) \quad (1).$$

In one embodiment, the decision policy network 410 comprises K fully-connected (FC) layers 416 with corresponding trainable parameters $\theta_{FC_1}, \ldots \theta_{FC_K}$, wherein each of the K data modalities has a corresponding FC layer 416.

In one embodiment, at each time step t, for each data modality k of the K data modalities (k∈[1, ..., K]), the decision policy network 410 is configured to: (1) estimate a corresponding policy distribution based on current hidden states $h_t$, and (2) apply a Gumbel-Softmax operation to the corresponding policy distribution to sample a corresponding binary decision $u_{t,k}$ (i.e., sampling from a Gumbel-Softmax distribution), wherein the binary decision $u_{t,k}$ is indicative of whether to select or skip/bypass data modality k for a current video segment s, (i.e., decision policy for data modality k) For example, if the binary decision $u_{t,k}$ is equal to 1, data modality k is selected for the current video segment $s_t$, such that data inputs representing the current video segment $s_t$ over data modality k are routed to the video recognition network 430 for processing (i.e., data modality k is a selected data modality 420). If the binary decision $u_{t,k}$ is equal to 0, data modality k is skipped/bypassed for the current video segment $s_t$, such that no data inputs representing the current video segment s, over data modality k are routed to the video recognition network 430 for processing (i.e., data modality k is an unselected data modality 421). Only data inputs representing the current video segment s, over each selected data modality 420 for the current video segment $s_t$ are forwarded to the video recognition network 430 for processing.

For example, in one embodiment, at each time step t, for each data modality k of the K data modalities, the decision policy network 410 is configured to: (1) generate, via a corresponding FC layer 416, a corresponding policy distribution $z_k$ including policy logits based on current hidden states h, and a trainable parameter $\theta_{FCk}$ corresponding to the FC layer 416, wherein $z_k \in \mathbb{R}^2$, and $z_k = \text{FC}(h_t, \theta_{FCk})$, and (2) apply a Gumbel-Softmax operation to the corresponding policy distribution $z_k$ to draw from a Gumbel-Softmax distribution a discrete sample representing a corresponding binary decision $u_{t,k}$, in accordance with equation (2) as provided below:

$$\widehat{P_k} = \arg\max(\log z_{i,k} + G_{i,k}) \quad (2)$$

wherein i∈{0, 1}, $G_{i,k}$ is a standard Gumbel distribution, $G_{i,k} = -\log(-\log U_{i,k})$, and $U_{i,k}$ is sampled from a uniform i.i.d distribution Unif(0, 1).

In one embodiment, $\widehat{P_k}$ is represented as a one-hot vector and one-hot coding is relaxed to compute a real-valued vector $P_k$ in accordance with equation (3) provided below:

$$P_{i,k} = \frac{\exp((\log z_{i,k} + G_{i,k})/\tau)}{\sum_{j \in \{0,1\}} \exp((\log z_{j,k} + G_{j,k})/\tau)}, \quad (3)$$

wherein $\tau$ is a temperature parameter which controls the discreteness of $P_k$.

In one embodiment, the video recognition network 430 comprises K sub-networks 435 with corresponding trainable parameters $\theta_{\psi_1}, \ldots, \theta_{\psi_K}$, wherein each of the K data modalities has a corresponding sub-network 435.

In one embodiment, the system 330 has at least two different operating phases: a training phase during which the K sub-networks 435 are jointly trained, and an inference phase during which the resulting trained K sub-networks 435 are deployed for video recognition.

In one embodiment, to increase video recognition accuracy (i.e., accuracy/quality of predictions/classifications) as well as minimize selection of data modalities that require more computation to increase computational efficiency, the training phase includes minimizing a loss represented in accordance with equation (4) provided below:

$$\mathbb{E}_{(V,y) \sim \mathcal{D}_{train}}\left[-y\log(\mathcal{P}(V;\Theta)) + \sum_{k=1}^{K} \lambda_k C_k\right] \cdot C_k = \begin{cases} \left(\frac{|U_k|_0}{C}\right)^2 & \text{if correct} \\ \gamma & \text{otherwise} \end{cases} \quad (4)$$

wherein P(V; Θ) is a prediction for a training video V, y is a one-hot encoded ground truth label for the training video V, $\lambda_k$ is a cost associated with processing data modality k, $U_k$ is a decision policy for data modality k, $C_k$ is a measurement of the fraction of video segments out of a total C of video segments that selected data modality k when the prediction is correct, and y is a parameter which penalizes incorrect predictions. $\gamma$ and $\lambda_k$ together are used to control trade-offs between video recognition accuracy and computational efficiency. For example, setting $\gamma$ and $\lambda_k$ both to 0 results in training without computational efficiency loss. The first part of equation (4) represents a standard cross-entropy loss to measure video recognition accuracy, and the second part of equation (4) drives the video recognition network 430 to learn a decision policy that favors selection of data modalities that are computationally more efficient in recognizing videos (e.g., processing RGB inputs requires more computation than audio inputs).

Assume an input video V captures mowing a lawn, and the input video V comprising a sequence of video segments over the RGB modality, the optical flow modality, and the audio modality. Specifically, the sequence of video segments are represented as a RGB stream comprising a sequence of RGB inputs (i.e., RGB frames of the video segments) representing the video segments over the RGB modality, an optical flow stream comprising a sequence of optical flow inputs (i.e., optical flow frames of the video segments) representing the video segments over the optical flow modality, and an audio stream comprising a sequence of audio inputs (i.e., audio frames of the video segments) representing the video segments over the audio modality. In one embodiment, in determining whether to select the optical flow modality for each video segment, the decision policy network 410 utilizes a RGB difference stream comprising a sequence of RGB difference inputs (i.e., RGB difference frames of the video segments) instead of the optical flow stream D to reduce computational costs.

As shown in FIG. 3, at time step t, for a current video segment $s_t$, the decision policy network 410 is configured to: (1) receive, from the RGB stream, RGB inputs $s_{t,rgb}$ representing the current video segment $s_t$ over the RGB modality, (2) receive, from the RGB difference stream, RGB difference inputs $s_{t,rgbd}$ representing the current video segment $s_t$ over the optical flow modality, (3) receive, from the audio stream, audio inputs $s_{t,aud}$ representing the current video segment $s_t$ over the audio modality, and (4) generate a corresponding binary decision policy vector based in part on the inputs received. Each element of the binary decision policy vector is a binary value (e.g., binary decision) corresponding to one of the RGB, optical flow, and audio modalities, and the element represents whether to select or skip/bypass the corresponding data modality for the current video segment $s_t$. For example, if an element of the binary decision policy vector that corresponds to the RGB modality is equal to 1, the RGB modality is a selected data modality 420 for the current video segment $s_t$; otherwise, if the element is equal to 0, the RGB modality is an unselected data modality 421.

Assume the video recognition network 430 includes a first sub-network 435 ("Subnet 1") corresponding to the RGB modality, a second sub-network 435 ("Subnet 2") corresponding to the optical flow modality, and a third sub-network 435 ("Subnet 3") corresponding to the audio modality. Assume a binary decision policy vector corresponding to a current video segment $s_t$ indicates that the RGB, optical flow, and audio modalities are all selected data modalities 420 for the current video segment $s_t$. For the current video segment $s_t$, the video recognition network 430 is configured to: (1) generate, via Subnet 1, a first segment-level prediction by forwarding the RGB inputs $s_{t,rgb}$ to Subnet 1 for processing, (2) generate, via Subnet 2, a second segment-level prediction by forwarding optical flow inputs $s_{t,of}$ (from the optical flow stream) representing the current video segment $s_t$ over the optical flow modality to Subnet 2 for processing, and (3) generate, via Subnet 3, a third segment-level prediction by forwarding the audio inputs $s_{t,aud}$ to Subnet 3 for processing.

The fusion unit 436 is configured to: (1) receive all segment-level predictions generated by Subnet 1, Subnet 2, and/or Subnet 3 for all video segments (including current video segment $s_t$) of the input video V, and (2) determine a video-level prediction for the entire input video V by averaging (i.e., aggregating) all the segment-level predictions received. As shown in FIG. 3, as the input video V captures mowing the lawn, the video-level prediction determined for the entire input video V may be "Mowing the Lawn".

Figure 4:
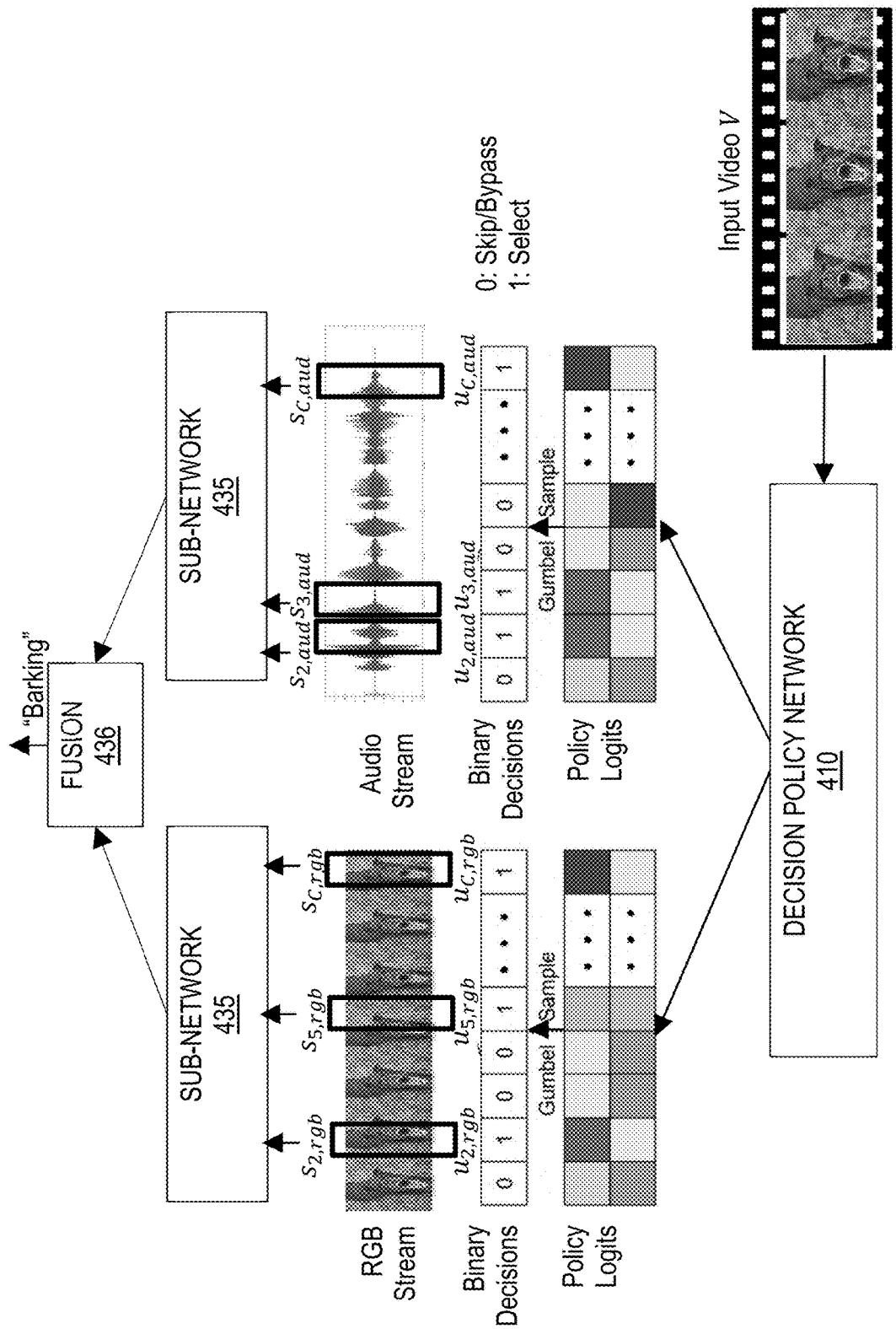
FIG. 4 illustrates an example application scenario involving the system, in accordance with an embodiment of the invention.

FIG. 4 illustrates an example application scenario involving the system 330, in accordance with an embodiment of the invention. Assume an input video V provided to the system 330 captures a dog barking, and the input video V comprises a sequence of video segments $s_1, s_2, \ldots, s_C$ over the RGB modality and the audio modality. Specifically, the sequence of video segments is represented as: (1) a RGB stream comprising a sequence of RGB inputs $s_{1,rgb}, s_{2,rgb}, \ldots, s_{C,rgb}$ representing the video segments over the RGB modality, and (2) an audio stream comprising a sequence of audio inputs $s_{1,aud}, s_{2,aud}, \ldots, s_{C,aud}$ representing the video segments over the audio modality.

At each time step t, the decision policy network 410 is configured to: (1) generate, based on RGB inputs $s_{t,rgb}$ (from the RGB stream) representing a current video segment $s_t$ over the RGB modality, a policy distribution $z_{rgb}$ including policy logits that correspond to the RGB modality, (2) generate, based on audio inputs $s_{t,aud}$ (from the audio stream) representing the current video segment $s_t$ over the audio modality, a policy distribution $z_{aud}$ including policy logits that correspond to the audio modality, (3) apply a Gumbel-Softmax operation to the policy distribution $z_{rgb}$ to sample a binary decision $u_{t,rgb}$ indicative of whether to select or skip/bypass the RGB modality for the current video segment $s_t$, and (4) apply a Gumbel-Softmax operation to the policy distribution $z_{aud}$ to sample a binary decision $u_{t,aud}$ indicative of whether to select or skip/bypass the audio modality for current video segment $s_t$.

As shown in FIG. 4, if binary decisions $u_{2,rgb}, u_{5,rgb}$, and $u_{C,rgb}$ are equal to 1, the RGB modality is a selected data modality 420 for only video segments $s_2, s_5$, and $s_C$, such that only RGB inputs $s_{2,rgb}, s_{5,rgb}$, and $s_{C,rgb}$ (from the RGB stream) (highlighted with a highlight box for ease of illustration) representing video segments $s_2, s_5$, and $s_C$ over the RGB modality are forwarded to a first sub-network 435 corresponding to the RGB modality. The first sub-network 435 generates segment-level predictions for video segments $s_2, s_5$, and $s_C$ by processing RGB inputs $s_{2,rgb}, s_{5,rgb}$, and $s_{C,rgb}$, respectively. As further shown in FIG. 4, if binary decisions $u_{2,aud}, u_{3,aud}$, and $u_{C,aud}$ are equal to 1, the audio modality is a selected data modality 420 for only video segments $s_2, s_3$, and $s_C$, such that only audio inputs $s_{2,aud}, s_{3,aud}$, and $s_{C,aud}$ (from the audio stream) (highlighted with a highlight box for ease of illustration) representing video segments $s_2, s_3$, and $s_C$ over the audio modality are forwarded to a second sub-network 435 corresponding to the audio modality. The second sub-network 435 generates segment-level predictions for video segments $s_2, s_3$, and $s_C$ by processing audio inputs $s_{2,aud}, s_{3,aud}$, and $s_{C,aud}$, respectively.

As shown in FIG. 4, the fusion unit 436 receives all segment-level predictions generated by the first and second sub-networks 435, and determines a video-level prediction for the entire input video V by averaging (i.e., aggregating) all the segment-level predictions received. As shown in FIG. 4, as the input video V captures the dog barking, the video-level prediction determined for the entire input video V is "Barking".

FIG. 5A illustrates a first sequence 500 of video segments over different modalities, in accordance with an embodiment of the invention. Assume an input video V provided to the system 330 captures fencing, and the input video V comprises a first sequence 500 of video segments over the RGB modality and the audio modality. For example, as shown in FIG. 5A, the first sequence 500 of video segments is represented as: (1) a RGB stream 501 comprising a sequence of RGB inputs representing the video segments over the RGB modality, and (2) an audio stream 502 comprising a sequence of audio inputs representing the video segments over the audio modality.

As shown in FIG. 5A, the system 330 selects the RGB modality for only the second and third video segments of the input video V, such that only RGB inputs representing the second and third video segments are processed by the system 330 for video recognition. As further shown in FIG. 5A, the system 330 skips/bypasses the audio modality for all the video segments of the input video V, such that the entire audio stream 502 is not processed for video recognition. As the input video V captures fencing, a video-level prediction determined by the system 330 for the entire input video V may be "Doing Fencing".

FIG. 5B illustrates a second sequence 510 of video segments over different modalities, in accordance with an embodiment of the invention. Assume an input video V provided to the system 330 captures playing a piano, and the input video V comprises a second sequence 510 of video segments over the RGB modality and the audio modality. For example, as shown in FIG. 5B, the second sequence 510 of video segments is represented as: (1) a RGB stream 511 comprising a sequence of RGB inputs representing the video segments over the RGB modality, and (2) an audio stream 512 comprising a sequence of audio inputs representing the video segments over the audio modality.

As shown in FIG. 5B, the system 330 selects the RGB modality for only the second video segment of the input video V, such that only RGB inputs representing the second video segment are processed by the system 330 for video recognition. As further shown in FIG. 5B, the system 330 selects the audio modality for all the video segments of the input video V, such that the entire audio stream 512 is processed by the system 330 for video recognition. As the input video V captures playing the piano, a video-level prediction determined by the system 330 for the entire input video V may be "Playing Piano".

Figure 5C:
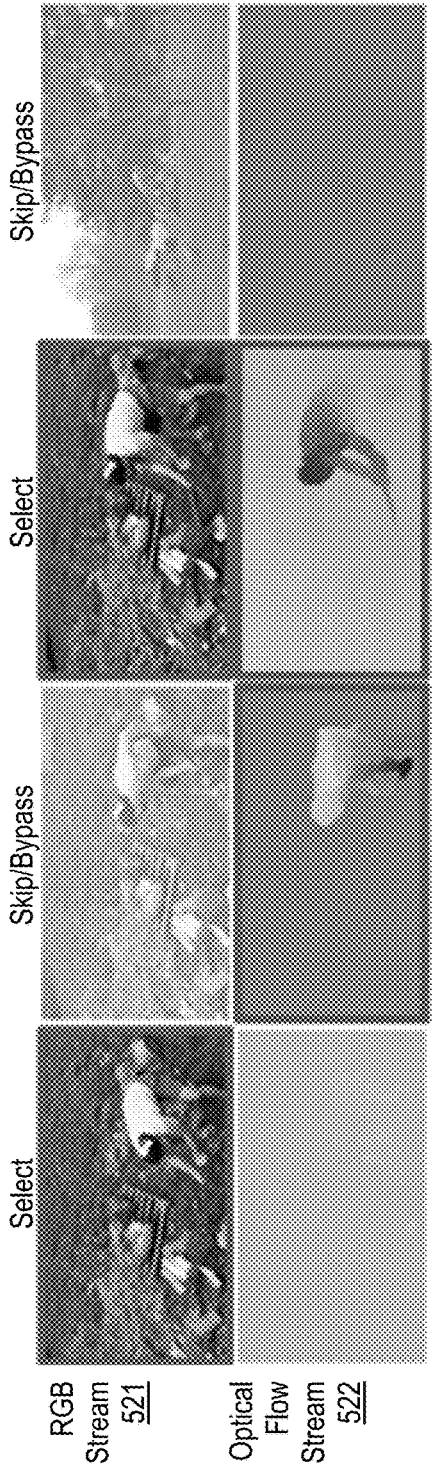
FIG. 5C illustrates a third sequence of video segments over different modalities, in accordance with an embodiment of the invention.

FIG. 5C illustrates a third sequence 520 of video segments over different modalities, in accordance with an embodiment of the invention. Assume an input video V provided to the system 330 captures chopping of wood, and the input video V comprises a third sequence 520 of video segments over the RGB modality and the optical flow modality. For example, as shown in FIG. 5C, the third sequence 520 of video segments is represented as: (1) a RGB stream 521 comprising a sequence of RGB inputs representing the video segments over the RGB modality, and (2) an optical flow stream 522 comprising a sequence of optical flow inputs representing the video segments over the optical flow modality.

As shown in FIG. 5C, the system 330 selects the RGB modality for only the first and third video segments of the input video V, such that only RGB inputs representing the first and third video segments are processed by the system 330 for video recognition. As further shown in FIG. 5C, the system 330 selects the optical flow modality for only the second and third video segments of the input video V, such that only optical flow inputs representing the second and third video segments are processed by the system 330 for video recognition. As the input video V captures chopping of wood, a video-level prediction determined by the system 330 for the entire input video V may be "Chopping Wood".

Figure 5D:
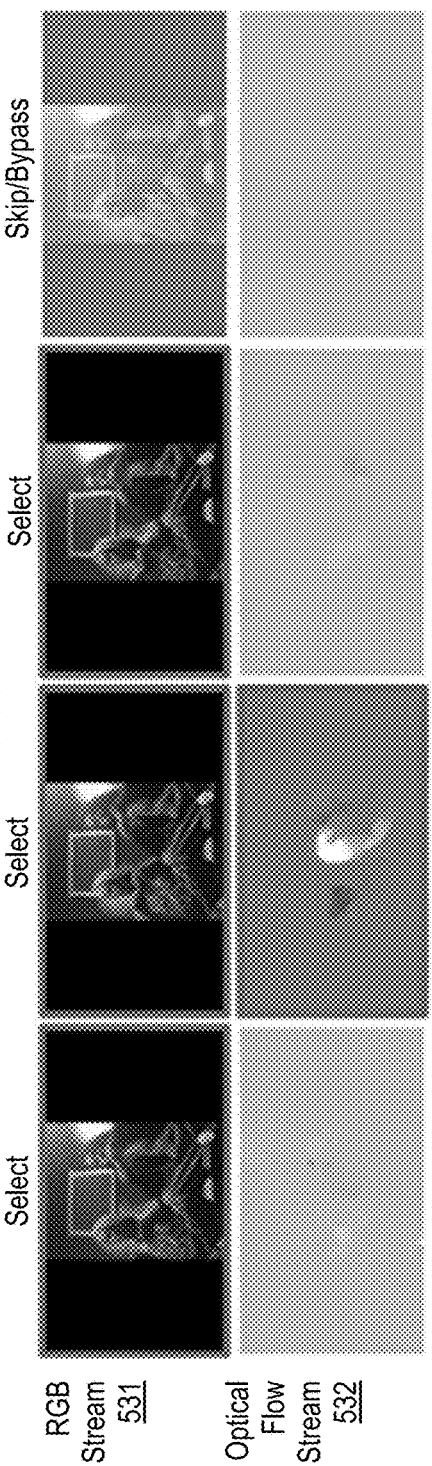
FIG. 5D illustrates a fourth sequence of video segments over different modalities, in accordance with an embodiment of the invention.

FIG. 5D illustrates a fourth sequence 530 of video segments over different modalities, in accordance with an embodiment of the invention. Assume an input video V provided to the system 330 captures ripping of paper, and the input video V comprises a fourth sequence 530 of video segments over the RGB modality and the optical flow modality. For example, as shown in FIG. 5D, the fourth sequence 530 of video segments is represented as: (1) a RGB stream 531 comprising a sequence of RGB inputs representing the video segments over the RGB modality, and (2) an optical flow stream 532 comprising a sequence of optical flow inputs representing the video segments over the optical flow modality.

As shown in FIG. 5D, the system 330 selects the RGB modality for only the first, second, and third video segments of the input video V, such that only RGB inputs representing the first, second, and third video segments are processed by the system 330 for video recognition. As further shown in FIG. 5D, the system 330 selects the optical flow modality for only the second video segment of the input video V, such that only optical flow inputs representing the second video segment are processed by the system 330 for video recognition. As the input video V captures ripping of paper, a video-level prediction determined by the system 330 for the entire input video V may be "Ripping Paper".

FIG. 5E illustrates a fifth sequence 540 of video segments over different modalities, in accordance with an embodiment of the invention. Assume an input video V provided to the system 330 captures playing an accordion, and the input video V comprises a fifth sequence 540 of video segments over the RGB modality, the optical flow modality, and the audio modality. For example, as shown in FIG. 5E, the fifth sequence 540 of video segments is represented as: (1) a RGB stream 541 comprising a sequence of RGB inputs representing the video segments over the RGB modality, (2) an optical flow stream 542 comprising a sequence of optical flow inputs representing the video segments over the optical flow modality, and (3) an audio stream 543 comprising a sequence of audio inputs representing the video segments over the audio modality.

As shown in FIG. 5E, the system 330 selects the RGB modality for only the first and fourth video segments of the input video V, such that only RGB inputs representing the first and fourth video segments are processed by the system 330 for video recognition. As further shown in FIG. 5E, the system 330 selects the optical flow modality for only the sixth video segment of the input video V, such that only optical flow inputs representing the sixth video segment are processed by the system 330 for video recognition. As further shown in FIG. 5E, the system 330 selects the audio modality for only the first to sixth video segments of the input video V, such that only audio inputs representing the first to sixth video segments are processed by the system 330 for video recognition. As the input video V captures playing the accordion, a video-level prediction determined by the system 330 for the entire input video V may be "Playing Accordion".

FIG. 5F illustrates a sixth sequence 550 of video segments over different modalities, in accordance with an embodiment of the invention. Assume an input video V provided to the system 330 captures cheerleading, and the input video V comprises a sixth sequence 550 of video segments over the RGB modality and the audio modality. For example, as shown in FIG. 5F, the sixth sequence 550 of video segments is represented as: (1) a RGB stream 551 comprising a sequence of RGB inputs representing the video segments over the RGB modality, and (2) an audio stream 552 comprising a sequence of audio inputs representing the video segments over the audio modality.

As shown in FIG. 5F, the system 330 selects the RGB modality for only the first and second video segments of the input video V, such that only RGB inputs representing the first and second video segments are processed by the system 330 for video recognition. As further shown in FIG. 5F, the system 330 selects the audio modality for only the first and second video segments of the input video V, such that only audio inputs representing the first and second video segments are processed by the system 330 for video recognition. As the input video V captures cheerleading, a video-level prediction determined by the system 330 for the entire input video V may be "Cheerleading".

Figure 5G:
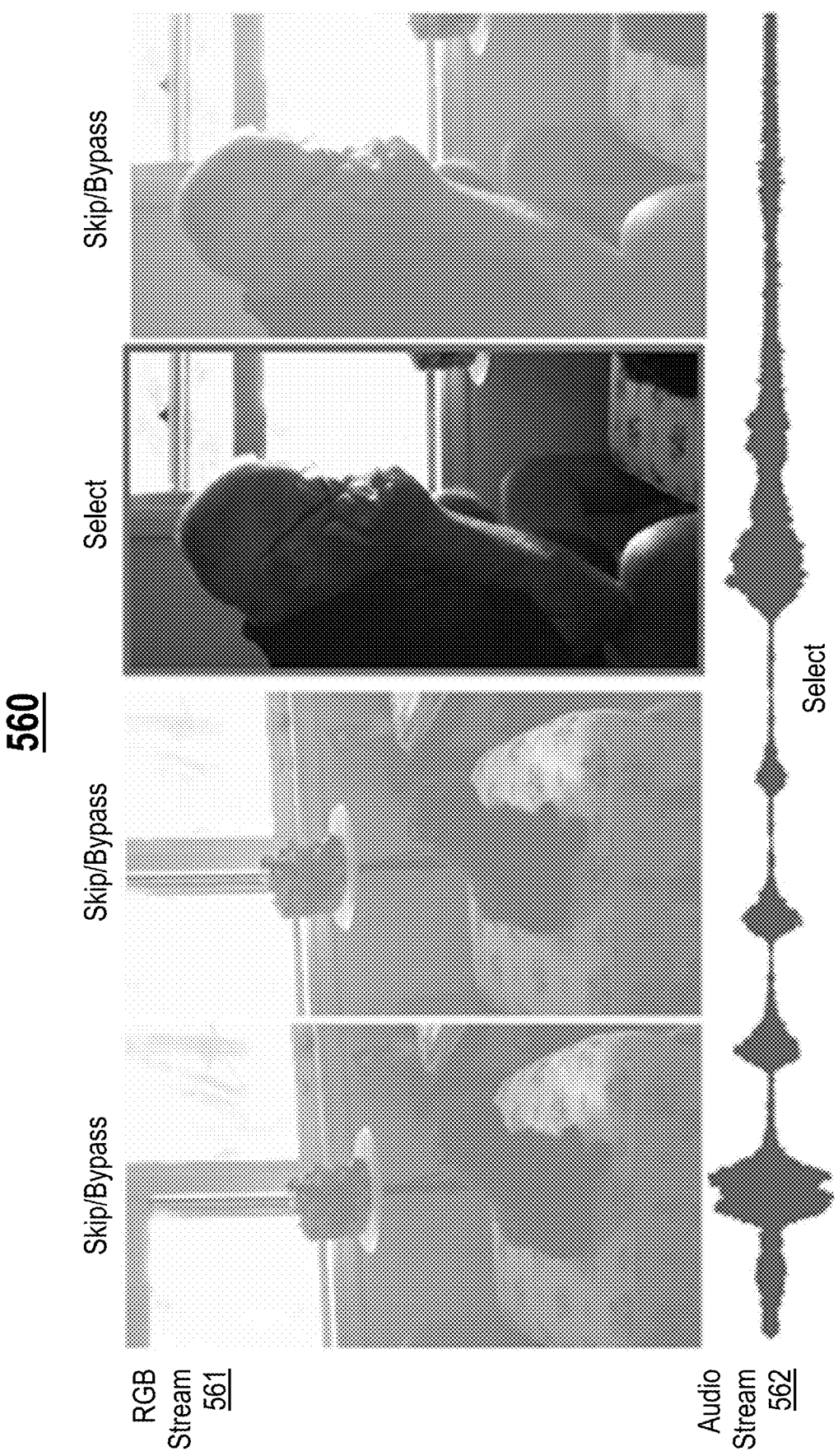
FIG. 5G illustrates a seventh sequence of video segments over different modalities, in accordance with an embodiment of the invention.

FIG. 5G illustrates a seventh sequence 560 of video segments over different modalities, in accordance with an embodiment of the invention. Assume an input video V provided to the system 330 captures playing a harmonica, and the input video V comprises a seventh sequence 560 of video segments over the RGB modality and the audio modality. For example, as shown in FIG. 5G, the seventh sequence 560 of video segments is represented as: (1) a RGB stream 561 comprising a sequence of RGB inputs representing the video segments over the RGB modality, and (2) an audio stream 562 comprising a sequence of audio inputs representing the video segments over the audio modality.

As shown in FIG. 5G, the system 330 selects the RGB modality for only the third video segment of the input video V, such that only RGB inputs representing the third video segment are processed by the system 330 for video recognition. As further shown in FIG. 5G, the system 330 selects the audio modality for all the video segments of the input video V, such that the entire audio stream 562 is processed by the system 330 for video recognition. As the input video V captures playing the harmonica, a video-level prediction determined by the system 330 for the entire input video V may be "Playing Harmonica".

Figure 5H:
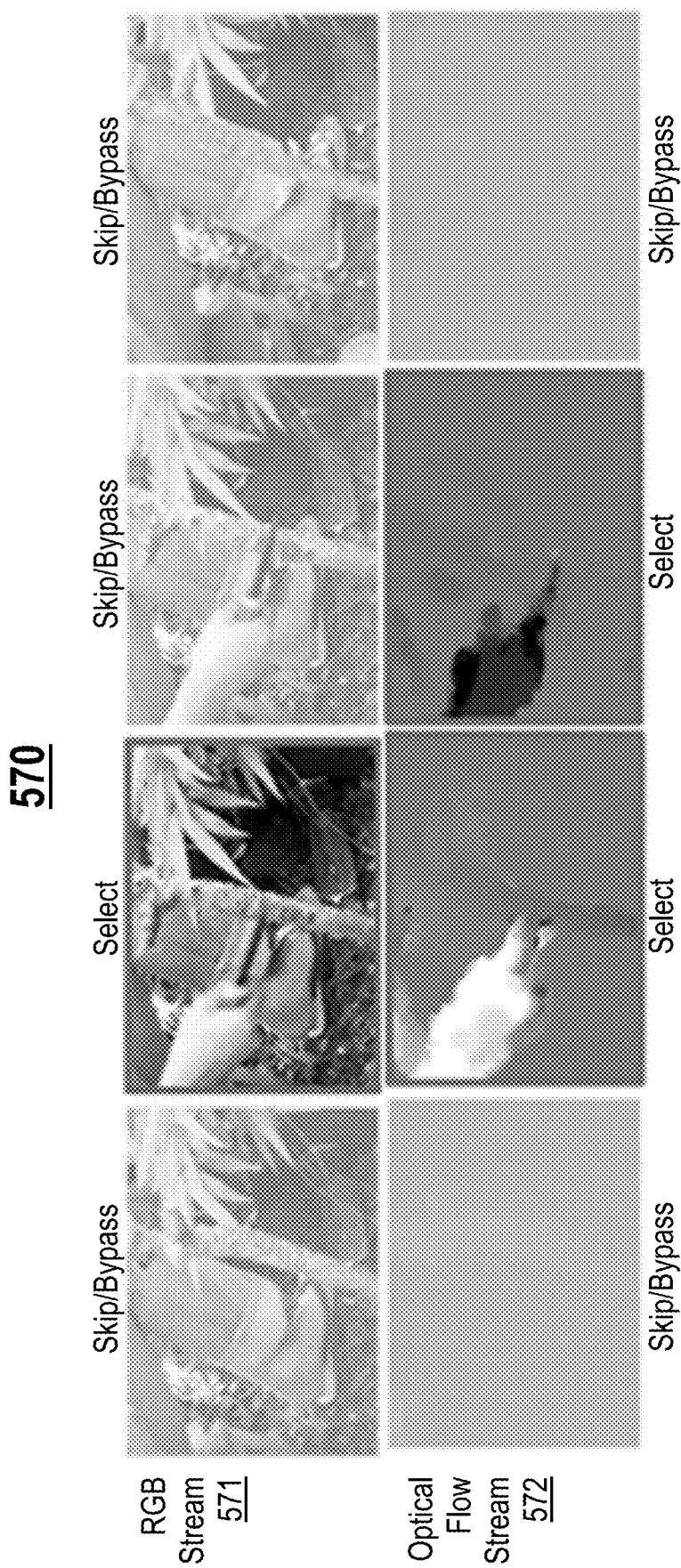
FIG. 5H illustrates an eighth sequence of video segments over different modalities, in accordance with an embodiment of the invention.

FIG. 5H illustrates an eighth sequence 570 of video segments over different modalities, in accordance with an embodiment of the invention. Assume an input video V provided to the system 330 captures chopping of wood, and the input video V comprises an eighth sequence 570 of video segments over the RGB modality and the optical flow modality. For example, as shown in FIG. 5H, the eighth sequence 570 of video segments is represented as: (1) a RGB stream 571 comprising a sequence of RGB inputs representing the video segments over the RGB modality, and (2) an optical flow stream 572 comprising a sequence of optical flow inputs representing the video segments over the optical flow modality.

As shown in FIG. 5H, the system 330 selects the RGB modality for only the second video segment of the input video V, such that only RGB inputs representing the second video segment are processed by the system 330 for video recognition. As further shown in FIG. 5H, the system 330 selects the optical flow modality for only the second and third video segments of the input video V, such that only optical flow inputs representing the second and third video segments are processed by the system 330 for video recognition. As the input video V captures chopping of wood, a video-level prediction determined by the system 330 for the entire input video V may be "Chopping Wood".

Figure 5I:
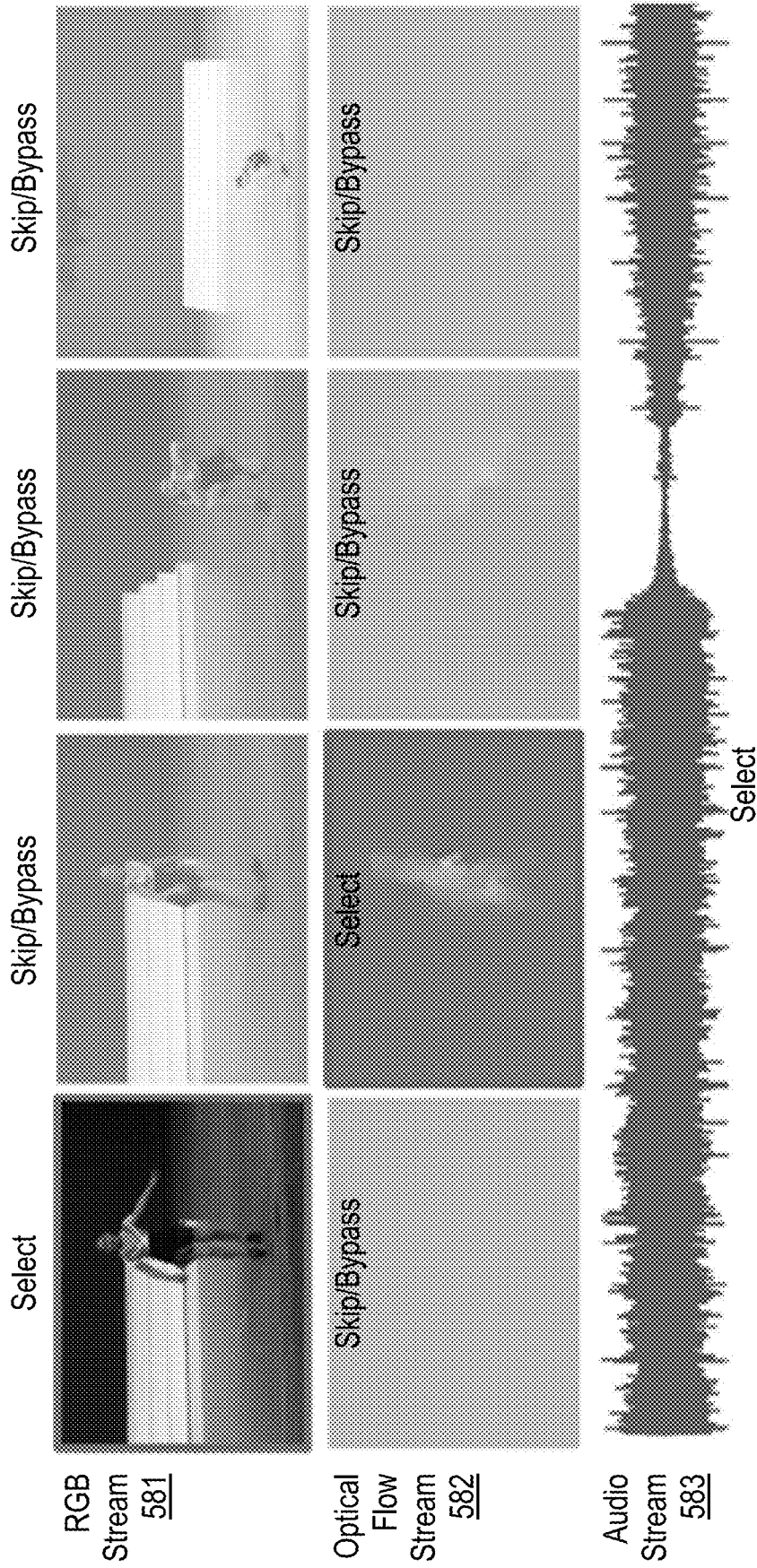
FIG. 5I illustrates a ninth sequence of video segments over different modalities, in accordance with an embodiment of the invention.

FIG. 5I illustrates a ninth sequence 580 of video segments over different modalities, in accordance with an embodiment of the invention. Assume an input video V provided to the system 330 captures tap dancing, and the input video V comprises a ninth sequence 580 of video segments over the RGB modality, the optical flow modality, and the audio modality. For example, as shown in FIG. 5I, the ninth sequence 580 of video segments is represented as: (1) a RGB stream 581 comprising a sequence of RGB inputs representing the video segments over the RGB modality, (2) an optical flow stream 582 comprising a sequence of optical flow inputs representing the video segments over the optical flow modality, and (3) an audio stream 583 comprising a sequence of audio inputs representing the video segments over the audio modality.

As shown in FIG. 5I, the system 330 selects the RGB modality for only the first video segment of the input video V, such that only RGB inputs representing the first video segment are processed by the system 330 for video recognition. As further shown in FIG. 5I, the system 330 selects the optical flow modality for only the second video segment of the input video V, such that only optical flow inputs representing the second video segment are processed by the system 330 for video recognition. As further shown in FIG. 5I, the system 330 selects the audio modality for all the video segments of the input video V, such that the entire audio stream 583 is processed by the system 330 for video recognition. As the input video V captures tap dancing, a video-level prediction determined by the system 330 for the entire input video V may be "Tap Dancing".

Figure 6:
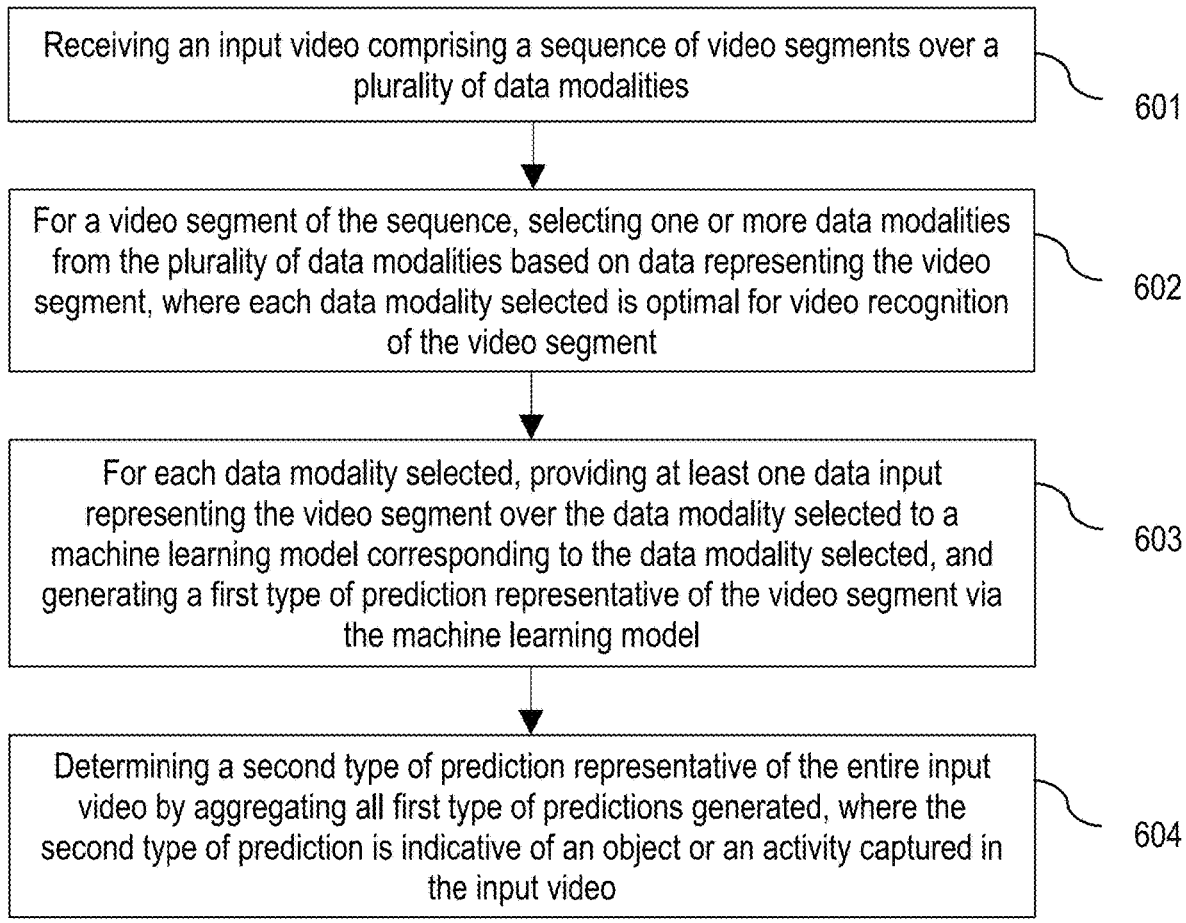
FIG. 6 is a flowchart for an example process for adaptive selection of data modalities for efficient video recognition, in accordance with an embodiment of the invention.

FIG. 6 is a flowchart for an example process 600 for adaptive selection of data modalities for efficient video recognition, in accordance with an embodiment of the invention. Process block 601 includes receiving an input video comprising a sequence of video segments over a plurality of data modalities. Process block 602 includes, for a video segment of the sequence, selecting one or more data modalities from the plurality of data modalities based on data representing the video segment, where each data modality selected is optimal for video recognition of the video segment. Process block 603 includes, for each data modality selected, providing at least one data input representing the video segment over the data modality selected to a machine learning model (e.g., sub-network) corresponding to the data modality selected, and generating a first type of prediction (e.g., segment-level prediction) representative of the video segment via the machine learning model. Process block 604 includes determining a second type of prediction (e.g., video-level prediction) representative of the entire input video by aggregating all first type of predictions generated, where the second type of prediction is indicative of an object or an activity captured in the input video.

In one embodiment, process blocks 601-604 are performed by one or more components of the system 330.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 7:
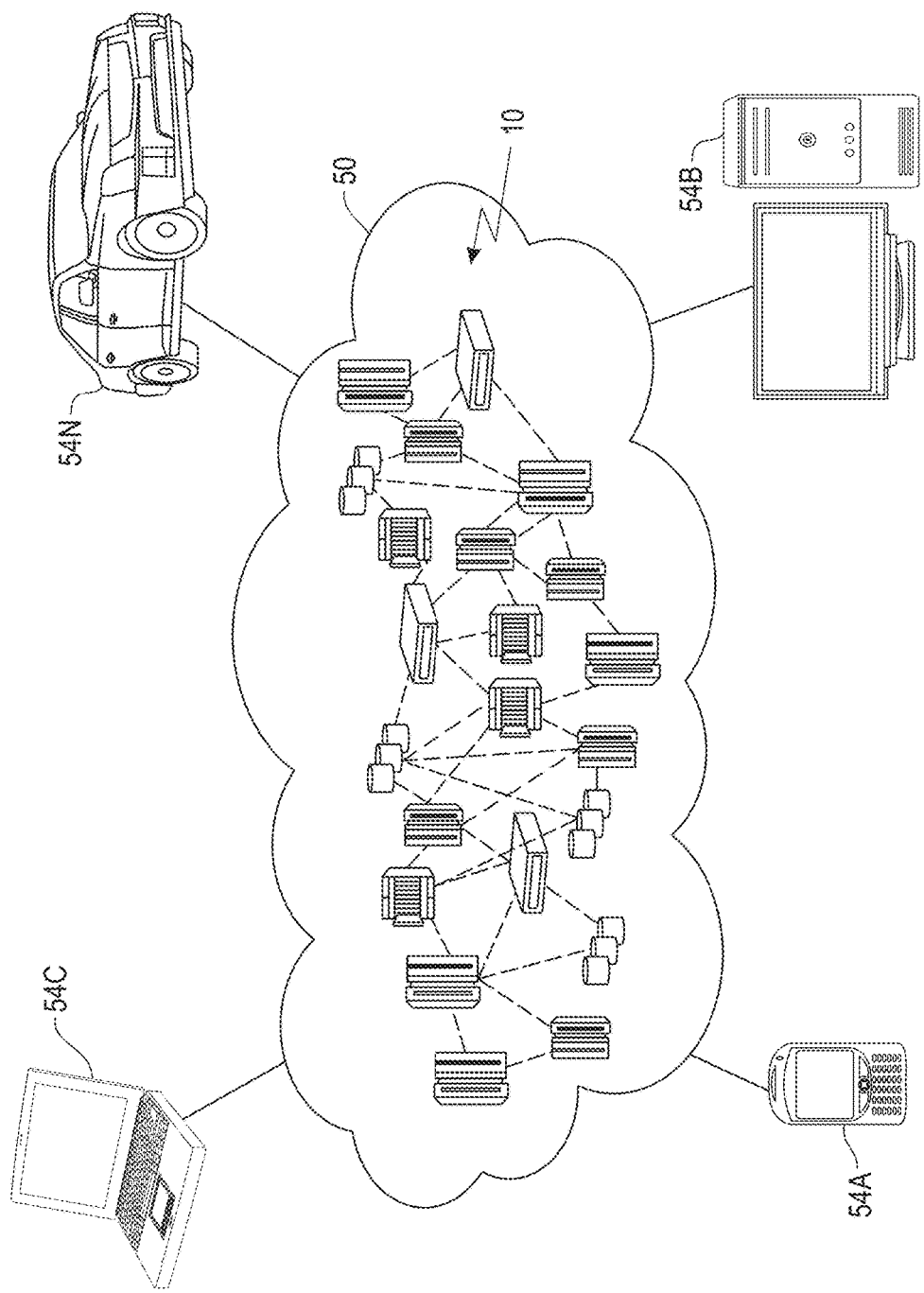
FIG. 7 depicts a cloud computing environment according to an embodiment of the present invention.

FIG. 7 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
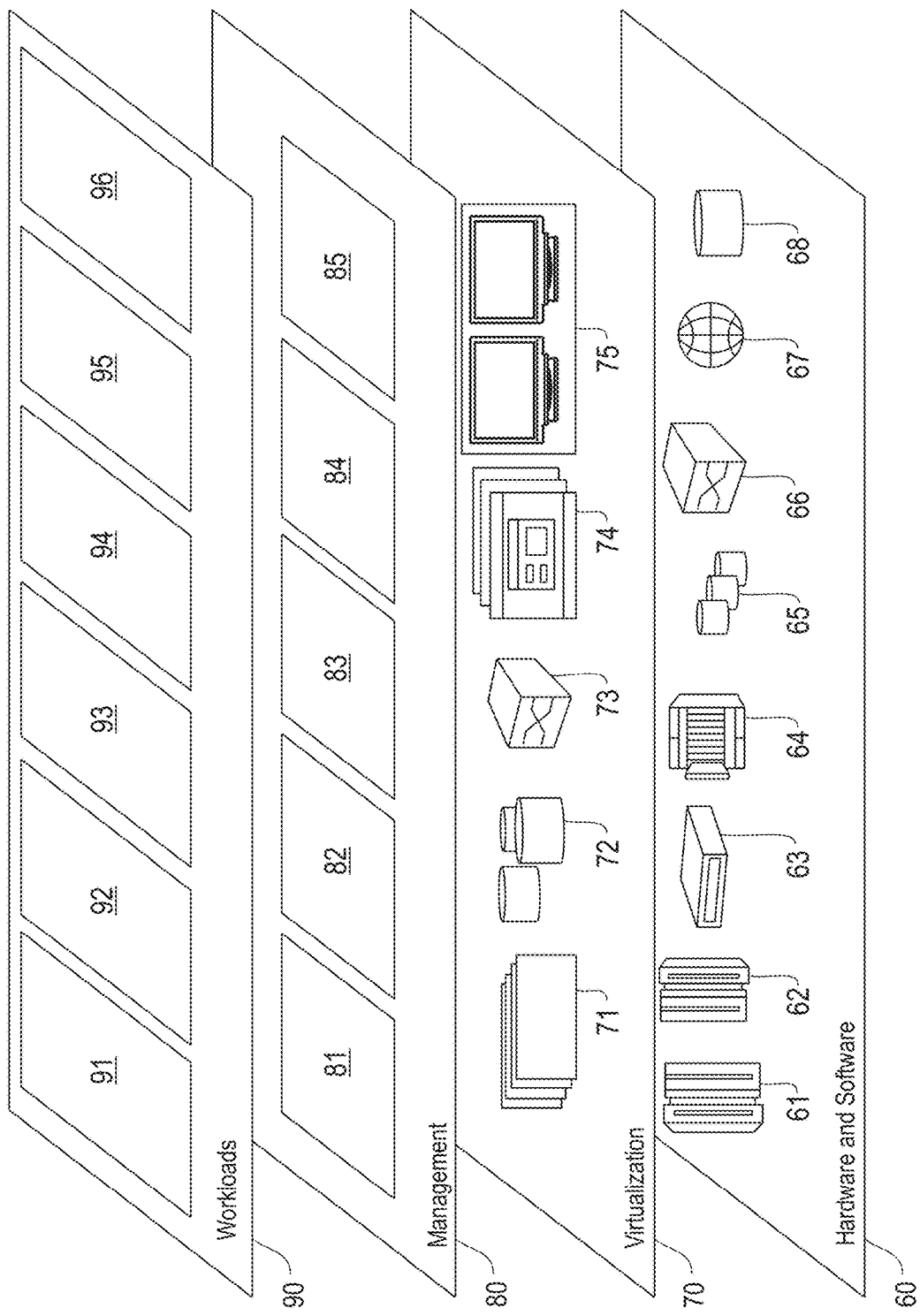
FIG. 8 depicts abstraction model layers according to an embodiment of the present invention.

FIG. 8 depicts a set of functional abstraction layers provided by cloud computing environment 50 according to an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and AI 96 (e.g., an adaptive multimodal learning system 330 (FIG. 1)).

Figure 9:
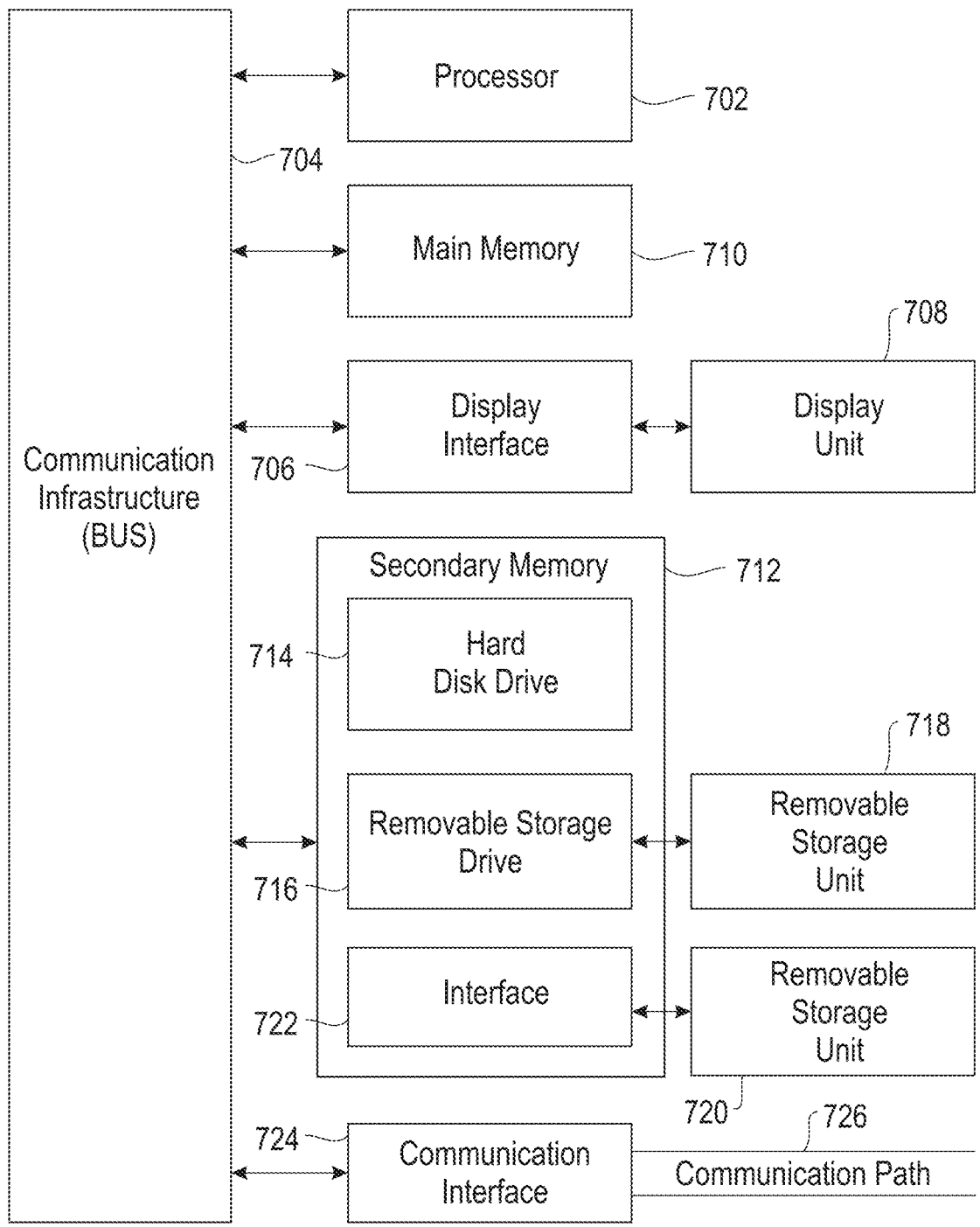
FIG. 9 is a high level block diagram showing an information processing system useful for implementing an embodiment of the invention.

FIG. 9 is a high level block diagram showing an information processing system 700 useful for implementing one embodiment of the invention. The computer system includes one or more processors, such as processor 702. The processor 702 is connected to a communication infrastructure 704 (e.g., a communications bus, cross-over bar, or network).

The computer system can include a display interface 706 that forwards graphics, text, and other data from the voice communication infrastructure 704 (or from a frame buffer not shown) for display on a display unit 708. In one embodiment, the computer system also includes a main memory 710, preferably random access memory (RAM), and also includes a secondary memory 712. In one embodiment, the secondary memory 712 includes, for example, a hard disk drive 714 and/or a removable storage drive 716, representing, for example, a floppy disk drive, a magnetic tape drive, or an optical disk drive. The removable storage drive 716 reads from and/or writes to a removable storage unit 718 in a manner well known to those having ordinary skill in the art. Removable storage unit 718 represents, for example, a floppy disk, a compact disc, a magnetic tape, or an optical disk, etc. which is read by and written to by removable storage drive 716. As will be appreciated, the removable storage unit 718 includes a computer readable medium having stored therein computer software and/or data.

In alternative embodiments, the secondary memory 712 includes other similar means for allowing computer programs or other instructions to be loaded into the computer system. Such means include, for example, a removable storage unit 720 and an interface 722. Examples of such means include a program package and package interface (such as that found in video game devices), a removable memory chip (such as an EPROM, or PROM) and associated socket, and other removable storage units 720 and interfaces 722, which allows software and data to be transferred from the removable storage unit 720 to the computer system.

In one embodiment, the computer system also includes a communication interface 724. Communication interface 724 allows software and data to be transferred between the computer system and external devices. In one embodiment, examples of communication interface 724 include a modem, a network interface (such as an Ethernet card), a communication port, or a PCMCIA slot and card, etc. In one embodiment, software and data transferred via communication interface 724 are in the form of signals which are, for example, electronic, electromagnetic, optical, or other signals capable of being received by communication interface 724. These signals are provided to communication interface 724 via a communication path (i.e., channel) 726. In one embodiment, this communication path 726 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for video recognition, comprising: receiving an input video comprising a sequence of video segments over a plurality of data modalities, wherein each segment comprising two or more frames;
   for at least one video segment of the sequence of video segments, adaptively selecting a subset of data modalities of the plurality of data modalities based on data representing the video segment, wherein each data modality selected is optimal for video recognition of the at least one video segment, and wherein each data modality of the plurality of data modalities that is not selected is redundant for the video recognition of the at least one video segment, wherein the plurality of data modalities are selected from a group comprising a RGB modality, an optical flow modality, and an audio modality;
   for each data modality selected, providing at least one data input representing the at least one video segment over the data modality selected to a machine learning model corresponding to the data modality selected, and generating a first type of prediction representative of the at least one video segment via the machine learning model; and
   determining a second type of prediction representative of the input video as a whole by aggregating all first type of predictions generated, wherein the second type of prediction is indicative of an object or an activity captured in the input video.

2. The method of claim 1, wherein the data representing the video segment comprise at least one of one or more RGB frames, one or more RGB difference frames, and one or more audio frames.

3. The method of claim 1, wherein each data modality of the plurality of data modalities has a corresponding machine learning model that is jointly trained with one or more other machine learning models corresponding to one or more other data modalities of the plurality of data modalities.

4. The method of claim 3, wherein each machine learning model corresponding to each data modality of the plurality of data modalities comprises a sub-network.

5. The method of claim 1, wherein the one or more data modalities selected provide an optimal trade-off between video recognition accuracy and computational efficiency.

6. The method of claim 1, further comprising:
   extracting, via a joint feature extractor, a joint feature from the data inputs representing the video segment over the plurality of data modalities;
   computing, via a long short-term memory (LSTM), hidden states for the video segment based in part on the joint feature extracted; and
   for each data modality of the plurality of data modalities:
      estimating a corresponding policy distribution based on the hidden states for the video segment; and
      applying a Gumbel-Softmax operation to the corresponding policy distribution to sample a corresponding binary decision indicative of whether to select the data modality for the video recognition of the video segment.

7. A system for video recognition, comprising: at least one processor; and a non-transitory processor-readable memory device storing instructions that when executed by the at least one processor causes the at least one processor to perform operations including:
   receiving an input video comprising a sequence of video segments over a plurality of data modalities, wherein each segment comprising two or more frames;
   for at least one video segment of the sequence of video segments, adaptively selecting a subset of data modalities of the plurality of data modalities based on data representing the video segment, wherein each data modality selected is optimal for video recognition of the at least one video segment, and wherein each data modality of the plurality of data modalities that is not selected is redundant for the video recognition of the at least one video segment, wherein the plurality of data modalities are selected from a group comprising a RGB modality, an optical flow modality, and an audio modality;
   for each data modality selected, providing at least one data input representing the at least one video segment over the data modality selected to a machine learning model corresponding to the data modality selected, and generating a first type of prediction representative of the at least one video segment via the machine learning model; and
   determining a second type of prediction representative of the input video as a whole by aggregating all first type of predictions generated, wherein the second type of prediction is indicative of an object or an activity captured in the input video.

8. The system of claim 7, wherein the data representing the video segment comprise at least one of one or more RGB frames, one or more RGB difference frames, and one or more audio frames.

9. The system of claim 7, wherein each data modality of the plurality of data modalities has a corresponding machine learning model that is jointly trained with one or more other machine learning models corresponding to one or more other data modalities of the plurality of data modalities.

10. The system of claim 9, wherein each machine learning model corresponding to each data modality of the plurality of data modalities comprises a sub-network.

11. The system of claim 7, wherein the one or more data modalities selected provide an optimal trade-off between video recognition accuracy and computational efficiency.

12. The system of claim 7, wherein the instructions further include:
   extracting, via a joint feature extractor, a joint feature from the data inputs representing the video segment over the plurality of data modalities;
   computing, via a long short-term memory (LSTM), hidden states for the video segment based in part on the joint feature extracted; and
   for each data modality of the plurality of data modalities:
      estimating a corresponding policy distribution based on the hidden states for the video segment; and
      applying a Gumbel-Softmax operation to the corresponding policy distribution to sample a corresponding binary decision indicative of whether to select the data modality for the video recognition of the video segment.

13. A non-transitory computer program product for video recognition, the computer program product comprising a computer readable storage medium having program instructions embodied therewith, the program instructions executable by a processor to cause the processor to: receive an input video comprising a sequence of video segments over a plurality of data modalities, wherein each segment comprising two or more frames;
   for at least one video segment of the sequence of video segments, adaptively select a subset of data modalities of the plurality of data modalities based on data representing the video segment, wherein each data modality selected is optimal for video recognition of the at least one video segment, and wherein each data modality of the plurality of data modalities that is not selected is redundant for the video recognition of the at least one video segment, wherein the plurality of data modalities are selected from a group comprising a RGB modality, an optical flow modality, and an audio modality;
   for each data modality selected, provide at least one data input representing the at least one video segment over the data modality selected to a machine learning model corresponding to the data modality selected, and generating a first type of prediction representative of the at least one video segment via the machine learning mode; and
   determine a second type of prediction representative of the input video as a whole by aggregating all first type of predictions generated, wherein the second type of prediction is indicative of an object or an activity captured in the input video.

14. The non-transitory computer program product of claim 13, wherein the data representing the video segment comprise at least one of one or more RGB frames, one or more RGB difference frames, and one or more audio frames.

15. The non-transitory computer program product of claim 13, wherein each data modality of the plurality of data modalities has a corresponding machine learning model that is jointly trained with one or more other machine learning models corresponding to one or more other data modalities of the plurality of data modalities.

\* \* \* \* \*